United States Patent
Tomihashi et al.

(10) Patent No.: US 6,325,752 B1
(45) Date of Patent: Dec. 4, 2001

(54) WATER-BASED FLUORORUBBER COATING COMPOSITION

(75) Inventors: Nobuyuki Tomihashi; Kiyotaro Terasaka; Toshiyuki Kinoshita; Koichiro Ogita, all of Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/485,128

(22) PCT Filed: Aug. 4, 1998

(86) PCT No.: PCT/JP98/03452

§ 371 Date: Feb. 4, 2000

§ 102(e) Date: Feb. 4, 2000

(87) PCT Pub. No.: WO99/07798

PCT Pub. Date: Feb. 18, 1999

(30) Foreign Application Priority Data

Aug. 6, 1997 (JP) .................................................. 9-211701

(51) Int. Cl.⁷ ................................ C08K 3/22; C08L 27/12
(52) U.S. Cl. .......................... 529/436; 524/432; 524/433; 524/436; 524/437; 524/450; 524/456; 524/544; 524/545
(58) Field of Search .................................... 524/436, 450, 524/456, 544, 545, 432, 433, 437

(56) References Cited

U.S. PATENT DOCUMENTS

| 4,069,291 | 1/1978 | Kidoh et al. | 524/423 |
|---|---|---|---|
| 4,339,553 | 7/1982 | Yoshimura et al. | 524/544 |
| 4,425,448 | 1/1984 | Concannon et al. | 524/431 |
| 4,503,179 | 3/1985 | Yoshimura et al. | 524/262 |
| 4,675,356 | 6/1987 | Miyata et al. | 524/424 |
| 5,342,553 | 8/1994 | Schubert | 252/609 |
| 5,604,283 | * 2/1997 | Wada et al. | 524/545 |
| 5,700,861 | * 12/1997 | Tomihashi et al. | 524/344 |

FOREIGN PATENT DOCUMENTS

| A 55-66970 | 5/1980 | (JP) . |
|---|---|---|
| 5647455 | 4/1981 | (JP) . |
| A 59-500865 | 5/1984 | (JP) . |
| 61166843A | 7/1986 | (JP) . |
| A 62-50133 | 3/1987 | (JP) . |
| 2248453 | 10/1990 | (JP) . |
| A 4-303853 | 10/1992 | (JP) . |
| A 7-501781 | 2/1995 | (JP) . |

* cited by examiner

Primary Examiner—Peter Szekely
(74) Attorney, Agent, or Firm—Birch, Stewart, Kolasch & Birch, LLP

(57) ABSTRACT

An aqueous coating composition comprising a fluororubber and, as an acid acceptor, at least one inorganic composite compound, for example, an inorganic composite oxide or an inorganic composite salt, in particular, an inorganic composite compound containing magnesium such as a hydrotalcite. Such an inorganic composite compound is not agglomerated to form secondary particles, when it is dispersed to primary particles, and can maintain the storage stability of the aqueous coating composition of a fluororubber.

9 Claims, No Drawings

WATER-BASED FLUORORUBBER COATING COMPOSITION

This application is the national phase under 35 U.S.C. §371 of PCT International Application No. PCT/JP98/03452 which has an International filing date of Aug. 4, 1998 which designated the United States of America.

FIELD OF THE INVENTION

The present invention relates to an aqueous coating composition of a fluororubber. In particular, the present invention relates to an aqueous coating composition comprising a fluororubber and a specific inorganic compound as an acid acceptor.

BACKGROUND ART

When fluororubbers are vulcanized, hydrogen fluoride (HF) is generated by a vulcanizing reaction. Thus, fluororubber coating compositions contain acid acceptors to capture the generated hydrogen fluoride.

In general, oxides or hydroxides of calcium, magnesium, zinc, lead, etc. are used as acid acceptors contained in aqueous coating compositions of fluororubbers (see, for example, JP-A-56-47455 and JP-A-02-248453). However, these inorganic compounds have low dispersion stability in aqueous compositions. Therefore, even when they are dispersed to primary particles, they quickly form secondary agglomerates and form agglomerated materials in the coated films, or such agglomerates deteriorate the storage stability of the aqueous coating compositions of fluororubbers themselves (only main parts containing acid acceptors in the case of two-pack type ones).

DISCLOSURE OF THE INVENTION

One object of the present invention is to provide an acid acceptor which does not form secondary agglomerates once it is dispersed to primary particles and can maintain the storage stability of an aqueous coating composition of a fluororubber, and also to provide an aqueous coating composition comprising a fluororubber and such an acid acceptor.

The above object is accomplished by an aqueous coating composition comprising a fluororubber and at least one inorganic composite compound as an acid acceptor.

Hereinafter, the present invention will be explained in detail.

<Fluororubbers>

Fluororubbers may be any conventionally used fluororubbers, and preferably have —$CH_2$— repeating units in their backbones.

Preferred examples of fluororubbers are copolymers of a monomer which forms repeating units containing —$CH_2$— groups (e.g. $CF_2$=$CH_2$, $CH_2$=$CH_2$, $CH_2$=$CHCH_3$, etc.), and at least one fluorine-containing monomer selected from the group consisting of fluorine-containing aliphatic monomers (e.g. $CF_2$=$CF_2$, $CF_2$=$CFCF_3$, $CF_2$=$CFCl$, $CF_2$=$CFCF_2H$, etc.) and fluoring-containing vinyl ethers (PFVE) of the formulas:

$$CF_2=CFO(CF_2)_nCF_3 \qquad (I)$$

wherein n is a number of 0 to 9, $$CF_2=CFO(CF_2CF_2CF_2O)_m{}_{CF2}CF_2CF_3 \qquad (II)$$

wherein m is a number of 1 to 5, $$CF_2=CFO[CF_2CF(CF_3)O]_jCF_2CF_2R \qquad (III)$$

wherein R is —$CF_3$ or —$CH_2I$, and j is a number of 1 to 5 when R is —$CF_3$, or a number of 0 to 5 when R is —$CH_2I$, and $$CF_2={}_{CFCF2}OCH_2(CF_2)_kZ \qquad (IV)$$

wherein k is a number of 1 to 12, and Z is a hydrogen atom, a fluorine atom or a chlorine atom.

In the concrete, copolymers are (1) a copolymer comprising a monomer which provides repeating units containing —$CH_2$— groups, and the above fluorine-containing aliphatic monomer, (2) a copolymer comprising a monomer which provides repeating units containing —$CH_2$— groups, and the above PFVE, and (3) a copolymer comprising a monomer which provides repeating units containing —$CH_2$— groups, the above fluorine-containing aliphatic monomer and the above PFVE.

In general, a molar ratio of a monomer providing —$CH_2$— repeating units to other monomer is from 30:70 to 85:15.

Fluororubbers having iodine atoms bonded to the ends of polymer chains are preferable since they have good storage stability.

<Inorganic Composite Compounds>

The amount of an inorganic composite compound used as an acid acceptor is selected according to the acid-accepting properties and molecular weight of the compound. The amount of an inorganic composite compound is usually from 1 to 50 wt. parts, preferably from 3 to 30 wt. parts, per 100 wt. parts of a fluororubber.

One example of an inorganic composite compound is an inorganic compound of the formula:

$$[M_1X_1] \cdot \cdots \cdot [M_xX_x] \cdot yH_2O \qquad (V)$$

wherein $M_1$, - - - $M_x$ are each a metal element or its cation, $X_1$, - - - $X_x$ are each an atom such as oxygen, halogen, nitrogen, sulfur, phosphorus, etc.; a molecule such as ammonia, nitrogen dioxide, etc.; or an anion such as $OH^-$, $F^-$, $Cl^-$, $Br^-$, $I^-$, $CN^-$, $SCN^-$, $CO_3^{2-}$, $NO_3^-$, $SO_4^{2-}$, $PO_4^{3-}$, etc., x is an integer of 2 to 10, and y is a number of 0 to 20, provided that at least one of $M_1$, - - - $M_x$ is an alkaline earth metal element (e.g. Mg, Ca, Sr or Ba) or its cation.

An anion is not limited to those exemplified above and may be any anion that can form a salt with a metal cation, but cannot be an anion which forms a complex.

Specific examples of an inorganic composite compound (V) include $Al_2O_3 \cdot CaO \cdot 2SiO_2$, $CaO \cdot MgO \cdot 2SiO_2$, $2CaO \cdot SiO_2$, $CaO \cdot ZrO_2$, $CaCO_3 \cdot MgCO_3$, $MgO \cdot Al_2O_3$, $3MgCO_3 \cdot Mg(OH)_2$, $SrF_2 \cdot SrCl_2$, $3SrO \cdot Al_2O_3 \cdot 6H_2O$, $3BaO \cdot 2MnO_2$, etc.

Examples of inorganic composite compounds containing Mg are hydrotalcite compounds of the formula:

$$[(Mg^{2+})_{1-a}(Me^{3+})_a(Oh)_2]^{a+}[(A^{n-})_{a/n} \cdot zH_2O]^{a-} \qquad (VI)$$

$Me^{3+}$ is a trivalent metal cation (e.g. $Al^{3+}$, $Fe^{3+}$, $Cr^{3+}$, $Co^{3+}$, $In^{3+}$, etc.), $A^{n-}$ is a n-valent anion (e.g. $OH^-$, $F^-$, $Cl^-$, $Br^-$, $NO_3^-$, $CO_3^{2-}$, $SO_4^{2-}$, $FE(CN)_6^{3-}$, $CH_3COO^-$, $(COO)_2^{2-}$, etc.), z is a number of 0 to 20, and a is a positive number of up to 0.33.

Specific examples of hydrotalcite compounds include $Mg_6Al_2(OH)_{16}CO_3 \cdot 4H_2O$, $Mg_{4.5}Al_2(OH)_{13}CO_3 \cdot 3.5H_2O$, $MgAl_2(OH)_{13.5}CO_3 \cdot 3.5H_2O$, $Mg_{4.3}Al_2(OH)_{12.6}CO_3 \cdot zH_2O$, etc.

The average particle size of such an inorganic composite compound is usually 2 μm or less, for example, from 0.2 to 1 μm. As a particle size decreases, the ability of the compound to accept hydrogen fluoride, which generates in the course of the vulcanization of fluororubber, increases.

<Other Components>

The aqueous coating compositions of fluororubbers according to the present invention may optionally contain additives which are compounded in the conventional aqueous coating compositions of fluororubbers. Typical examples of such additives are as follows:

a) Vulcanizing Agents

Conventional vulcanizing agents may be used to vulcanize fluororubbers. Examples of vulcanizing agents include
   i) aliphatic amines (e.g. triethylenetetramine, tetraethylenepentamine, ethylenediamine, trimethylenediamine, ethanolamine, 3,9-bis(3-aminopropyl)-2,4,8,10-tetraoxa-2-spiro[5.5]undecane, etc.) and their salts; aromatic polyamines (e.g. diaminodiphenylmethane, xylylenediamine, phenylenediamine, diaminophenylsulfone, etc.) and their salts; polyamine compounds (e.g. modified polyamines, polyamidoamines, etc.),
   ii) phenol derivatives (e.g. hydroquinone, bisphenol A, bisphenol AF, etc.); polyhydroxyl compound having enol type hydroxyl groups (e.g. phenol resins, etc.) and their metal salts; polyols such as $Rf(CH_2OH)_2$ wherein Rf is a perfluoroalkylene group having 1 to 500 carbon atoms,
   iii) polythiols (e.g. triazinethiol, 1,6-hexanedithiol, 4,4'-dimercaptodiphenyl, 1,5-naphthalenedithiol, etc.),
   iv) peroxide vulcanizing agents such as combinations of peroxide compounds (e.g. benzyl peroxide, azoisobutyronitrile, etc.) and vinyl or allyl compounds (e.g. vinyl ethers, vinylsilanes, triallylisocyanurate, etc.).

In addition, commercially sold vulcanizing agents for fluororubbers, which are soluble in water or alcohol, may be used.

A vulcanizing agent is used in an amount of from 0.1 to 20 wt. parts, preferably from 0.5 to 5 wt. parts, per 100 wt. parts of a fluororubber.

b) Vulcanizing Accelerators

Vulcanizing accelerators may be any conventional vulcanizing accelerators which are used to vulcanize fluororubbers. Typical examples of vulcanizing accelerators include quaternary ammonium salts (e.g. diazabicycloundeceneben-zyl chloride (DBU-b), etc.); tertiary amines (e.g. diazabicyclooctane (DABCO), diazabicycloundecene (DBU), triethylamine, etc.); and quaternary phosphonium salts (e.g. triphenylphosphinebenzyl chloride, etc.). Among them, those soluble in water or alcohol are preferable.

A vulcanizing agent is used in an amount of from 0 to 10 wt. parts, preferably from 0.1 to 5 wt. parts, per 100 wt. parts of a fluororubber.

c) Dispersants

Dispersants can be used to disperse fluororubbers, acid acceptors and optionally compounded additives in water.

Preferable examples of dispersants are as follows:
   anionic surfactants such as laurylsulfate salts, perfluoroalkylcarboxylate salts, ω-hydroperfluoroalkylcarboxylate salts, etc.;
   nonionic surfactants such as polyethylene glycol derivatives, polyethylene glycol-polypropylene glycol derivatives, etc.; and
   resinous dispersants such as alkyl polyethylene glycol ethers, alkylphenyl polyethylene glycol ethers, alkylpolyethylene glycol esters, ethylene glycol-propylene glycol copolymers, polyethylene glycol dialkyl esters, etc.

A dispersant is used in an amount of from 0.1 to 10 wt. parts per 100 wt. % of the whole weight of an aqueous coating composition.

d) Fillers

Fillers may be added to the aqueous coating compositions of the present invention, if desired, and conventional fillers, which are exemplified below, can be used:
   carbon black, silica, mica, zinc oxide, barium sulfate, calcium carbonate, talc, diatomaceous earth, etc.

A filler is used in an amount of from 0 to 200 wt. parts per 100 wt. parts of a fluororubber.

e) Colorants

To color fluororubber coating films, conventional colorants, which are exemplified below, maybe added to the aqueous coating compositions of the present invention:
   inorganic pigments (e.g. titanium oxide, red oxide, inorganic mixed oxides, etc.); and organic pigments (e.g. phthalocyanine pigments, perylene pigments, etc.).

A colorant is used in an amount of from 0 to 200 wt. parts per 100 wt. parts of a fluororubber.

f) Stabilizers

It is preferable to add stabilizers to the aqueous coating compositions of the present invention to prevent the initiation of reactions such as vulcanization during the storage of the compositions. Organic acids (e.g. acetic acid, formic acid, succinic acid, etc.) are preferably used as stabilizers. The amount of a stabilizer may be suitably determined according to the kinds and amounts of other components.

g) Tackifiers

Tackifiers may be added to the aqueous coating composition of the present invention when it is necessary to improve the affinity of a coated film formed from the aqueous coating composition with a substrate or a primer.

As tackifiers, conventional tackifiers such as silane coupling agents, titanium coupling agents, aluminum coupling agents, and the like may be used. Among vulcanizing agents, those having adhesive properties such as polyamidoamine, phenol resins, etc. can function as tackifiers depending on a compounded amount.

h) Non-tackifying Agents

To impart non-tackiness to the surface of a coated film formed from the aqueous coating composition of the present invention, non-tackifying agents can be compounded in the aqueous coating composition of the present invention.

Preferable examples of non-tackifying agents are as follows:

1) Fluororesins
   polyvinylidene fluoride (PVdF), ethylenetetrafluoroethylene copolymers (ETFE), polychlorotrifluoroethylene (CTFE), tetrafluoroethylene-hexafluoropropylene-perfluorovinyl ether copolymers (EPA), tetrafluoroethylene-perfluorovinyl ether copolymers (PFA), polytetrafluoroethylene (PTFE), etc.

2) Terminal-modified Polyfluoropolyethers
   polyfluoropolyethers having functional groups reactive with fluororubbers (e.g. $-NH_2$, $-CH_2OH$, etc.) at chain ends.

The fluororesin 1) is compounded in an amount of 400 wt. parts or less per 100 wt. parts of a fluororubber, while the terminal-modified polyfluoropolyether 2) is used in an amount of 20 wt. parts or less per 100 wt. parts of a fluororubber.

i) Other Additives

To adjust the viscosity and to further improve the storage stability of an aqueous coating composition, the aqueous coating composition of the present invention may contain ethylene glycol, propylene glycol, glycerin POVAL, polycarboxylic acid salts, polyethylene glycol derivatives, polyethylene glycolpolypropylene glycol derivatives, methyl cellulose, carboxymethyl cellulose, etc.

The aqueous coating composition of the present invention can be prepared as follows:

Firstly, a nonionic or anionic surfactant is mixed with the dispersion of a fluororubber, which is obtained by emulsion polymerization, in an amount of about 4 to 10 wt. parts per 100 wt. parts of the fluororubber solid content, and then the mixture is concentrated (usually to 50 vol. % or less).

An inorganic composite compound is dispersed in the aqueous solution of a nonionic or anionic surfactant by milling.

Additives such as fillers, colorants, etc. (except vulcanizing agents) are dispersed in the aqueous solution of a nonionic or anionic surfactant by milling together with or separately from the inorganic composite compound.

Then, the dispersion of the fluororubber, the milled dispersion (s), additives for coating compositions, and optional components (e.g. fluororesins, terminal-modified perfluoropolyethers, etc.) are mixed in an arbitrary order to obtain an aqueous coating composition.

An additive for adjusting the viscosity of the coating composition, typically a thickening agent, is added to the dispersion of a fluororubber, and then, if desired, the dispersion of a fluororubber (concentrated product) or a terminal-modified polyfluoroether emulsified with a surfactant may be added to obtain the main part of the coating composition.

Separately, a vulcanizing agent is dissolved in water or alcohol. The solution may be mixed with the main part to obtain a one-part coating, if the mixture does not gelate.

If the coating composition is not a one-part type, a determined amount of the solution of the vulcanizing agent is added to the main part of the composition just prior to the application.

Then, the coating composition is applied to a substrate by any conventional coating method such as brush coating, spray coating, dip coating, flow coating, dispenser coating, screen coating, etc. and dried followed by baking at a temperature of 100 to 350° C. for 5 minutes to 24 hours.

A substrate may be treated with a primer such as a silane compound or a silicone compound to enhance the adhesion between the coated film and the substrate.

The aqueous coating compositions of fluororubbers according to the present invention can be used like the conventional aqueous coating compositions of fluororubbers in the following applications:

Surface modifiers of metals, rubbers, plastics, glass, etc.

Sealing and coating materials which are required to have heat resistance, chemical resistance, oil resistance, non-tackiness, etc., for example, metal gaskets, oil seals, and the like.

Non-tacky coating materials of rolls or belts for office automation equipment, or bleed barriers.

Coating of fabric sheets and belts by dipping and baking.

When the aqueous coating compositions of fluororubbers according to the present invention have a high viscosity or are highly concentrated, they can be used as sealing materials, linings or sealants having complicated shapes. When the aqueous coating compositions have a low viscosity, they can be shaped in the form of a thin film having a thickness of several microns. When the aqueous coating compositions have a medium viscosity, they can be applied on precoated metals, O-rings, diaphragms, lead valves, and the like.

Furthermore, the aqueous coating compositions of fluororubbers according to the present invention may be used to coat conveying rolls or belts for fabric or paper sheets, printing rolls, chemical-resistant tubes, caps of chemical containers, fuel hoses, etc.

EXAMPLES

Example 1

A pigment (TALOX R-516L manufactured by TITANIUM INDUSTRIES, LTD.) and a hydrotalcite DHT-4A (manufactured by KYOWA CHEMICAL INDUSTRIES, Ltd.) in a weight ratio of 3:5 were dispersed in water containing a surfactant (NONION HS-208 manufactured by NOF Corporation) (7 g/L) by milling to prepare a paste (solid content: 14%) (hereinafter referred to as "pig paste").

The properties of the pig paste were measured or evaluated as follows:

a) Dispersing Test

The viscosity and pH of the above pig paste were measured at 25° C. Then, the sizes of agglomerates were measured with a grind gauge in accordance with JIS K 5400-1990, 4.7.2. Furthermore, the pig paste was filtered through a filter having a pore size of 20 µm under a pressure of 3.5 kgf/m²G, and a filter penetration rate was calculated from the solid amount.

In addition, to evaluate the static storage stability of the pig paste, the dispersibility of the paste after 2 and 4 weeks was measured with a grind gauge according to JIS K 5400-1990, 4.7.2.

b) Properties of Vulcanized Material

A surfactant NONION HS-208 (manufactured by NOF Corporation) was added to the dispersion of a fluororubber (vinylidene fluoride-hexafluoropropylene-tetrafluoroethylene copolymer) to separate the fluororubber from water followed by concentration. Then, NONION HS-215 (manufactured by NOF Corporation) was added to the concentrate to adjust the solid concentration to 60%, which will be hereinafter referred to as "adjusted liquid of the fluororubber".

A mixture (60 wt. parts) of EPOMATE F-100 (manufactured by YUKA SHELL Co., Ltd.) as a vulcanizing agent and a silane coupling agent (A-1100 manufactured by NIPPON UNICAR Co., Ltd.) in a weight ratio of 1:4 was dissolved in water (40 wt. parts) to obtain the solution of the vulcanizing agent.

The adjusted liquid of the fluororubber (75 wt. parts), the pig paste (23 wt. parts) and the solution of the vulcanizing agent (2 wt. parts) were mixed with a disper and poured in a square palette. Then, the mixture was thoroughly dried and then baked at 150° C. for 60 minutes.

The formed rubber film having a thickness of about 300 µm was peeled off from the palette and blanked out in the form of a JIS No. 4 dumbbell. Then, this sample was subjected to the tensile test using a TENSILON tester at a pulling rate of 500 mm/min. according to JIS K 6893.

c) Properties of Coating Composition and Appearance of Coated Film

The dispersion of a fluororesin (tetrafluoroethylenehexafluoropropylene copolymer) (NEOFLON DISPERSION ND-1 manufactured by DAIKIN INDUSTRIES, LTD.) and the adjusted liquid of the fluororubber were mixed in a weight ratio of 1:1. Then, the pig paste was added to this mixture so that the weight ratio of the fluororubber to the acid acceptor was 100:5.

Separately, NONION DS-60HN (manufactured by NOF Corporation) and ADEKANOL UH-140S (manufactured by ASAHI DENKA KOGYO K.K.) as additives of a coating composition were dissolved in water, and then mixed in the above mixture. Hereinafter, this mixture will be referred to as "Liquid A".

The viscosity and pH of Liquid A were measured at 25° C. Liquid A was dried at 150° C. and then baked. The obtained solid was weighed, and the solid content was calculated from the weight of Liquid A and the weight of the solid.

To measure the pot life of Liquid A after the addition of the solution of the vulcanizing agent, Liquid A and the solution of the vulcanizing agent were mixed so that the weight ratio of the former to the latter was 100:5, and the viscosity of the mixture was measured at 25° C. just after the mixing, and after 24 hours and 72 hours from the mixing.

Furthermore, to compare the storage stability of the acid acceptor, only Liquid A was coated on a clean glass plate with a doctor blade (4 MIL) just after the preparation of Liquid A and after leaving Liquid A at rest for one month, and then dried, and the presence of agglomerates in the film was observed.

manufactured by KYOWA CHEMICAL INDUSTRIES, Ltd.) was used as an acid acceptor, the weight ratio of the pigment to the acid acceptor was 3:4.5, and the weight ratio of the fluororubber to the acid acceptor was 100:4.5.

Comparative Example 3

Tests a, b and c were carried out in the same manner as in Example 1 except that magnesium oxide having small particle sizes (MICROMAG 3-150 manufactured by KYOWA CHEMICAL INDUSTRIES, Ltd.) was used as an acid acceptor, the weight ratio of the pigment to the acid acceptor was 3:3, and the weight ratio of the fluororubber to the acid acceptor was 100:3.

The results obtained in Example and Comparative Examples are shown in Table 1.

TABLE 1

|  | Ex. 1 | C. Ex. 1 | C. Ex. 2 | C. Ex. 3 |
| --- | --- | --- | --- | --- |
| Acid acceptor | Inorganic composite compound | Magnesium oxide | Magnesium hydroxide | Small particle magnesium oxide |
| Average particle size ($\mu$m) | <1 | 14 | 2 | 2 |
| Dispersing test |  |  |  |  |
| Viscosity (cp) | 20 | 870 | 270 | 920 |
| pH | 8.5 | 10.1 | 9.6 | 9.8 |
| Grind gauge ($\mu$m) |  |  |  |  |
| Just after preparation | <10 | <10 | <10 | <10 |
| After 2 weeks | <10 | 18 | 16 | 25 |
| After 4 weeks | <10 | 22 | 20 | 55 |
| Filter penetration rate | 95 | 82 | 72 | 86 |
| Properties of vulcanized material |  |  |  |  |
| 100% tensile stress (kgf/m$^2$) | 14 | 15 | 22 | 22 |
| Tensile strength (kgf/m$^2$) | 76 | 72 | 77 | 81 |
| Elongation (%) | 570 | 520 | 370 | 440 |
| Properties of coating composition and appearance of coated film |  |  |  |  |
| Viscosity (cp) | 58 | 63 | 61 | 115 |
| pH | 8.3 | 9.7 | 9.3 | 9.4 |
| Solid content (%) | 49.4 | 49.1 | 49.1 | 49.3 |
| Viscosity (cp) |  |  |  |  |
| Just after mixing | 38 | 37 | 38 | 75 |
| after 24 hrs | 35 | 33 | 35 | 72 |
| after 72 hrs | 30 | 48 | 33 | 70 |
| Film appearance |  |  |  |  |
| Just after preparation | No particle | A few small particles | No particle | A few small particles |
| After 1 month | No particle | Many large particles | A few small particles | A few large particles |

Comparative Example 1

Tests a, b and c were carried out in the same manner as in Example 1 except that magnesium oxide (MA-150 manufactured by KYOWA CHEMICAL INDUSTRIES, Ltd.) was used as an acid acceptor, the weight ratio of the pigment to the acid acceptor was 3.3, and the weight ratio of the fluororubber to the acid acceptor was 100:3.

Comparative Example 2

Tests a, b and c were carried out in the same manner as in Example 1 except that magnesium hydroxide (KISMA F

What is claimed is:

1. An aqueous coating composition comprising a fluororubber and at least one inorganic composite compound as an acid acceptor disposed in an aqueous solvent, wherein said inorganic composite compound has an average particle size, of 2 $\mu$m or less.

2. The aqueous coating composition according to claim 1, wherein said inorganic composite compound comprises a compound of an alkaline earth metal element.

3. The aqueous coating composition according to claim 1, wherein said inorganic composite compound comprises a magnesium compound.

4. The aqueous coating composition according to any one of claims 1 to 3, which contains 1 to 50 parts by weight of said inorganic composite compound per 100 parts by weight of said fluororubber.

5. The aqueous coating composition according to claim 1, wherein said inorganic composite compound has an average particle size of 1 μm or less.

6. The aqueous coating composition according to claim 1, wherein said inorganic composite compound has an average particle size of from 0.2 to 1 μm.

7. The aqueous coating composition according to claim 4, wherein said inorganic composite compound has an average particle size of from 0.2 to 1 μm.

8. The aqueous coating composition according to claim 4, wherein the fluororubber is a copolymer of (1) a monomer which forms repeating units which containing —CH$_2$— groups, and (2) at least one fluorine-containing monomer selected from the group consisting of fluorine-containing aliphatic monomers and fluorine-containing vinyl ethers of the following formulas:

$$CF_2\!\!=\!\!CFO\,(CF_2)_nCF_3 \tag{I}$$

wherein n is a number of 0 to 9, $$CF_2\!\!=\!\!CFO\,(CF_2CF_2CF_2O)_mCF_2CF_2CF_3 \tag{II}$$

wherein m is a number of 1 to 5, $$CF_2\!\!=\!\!CFO[CF_2CF(CF_3)\,O]_jCF_2CF_2R \tag{III}$$

wherein R is —CF$_3$ or —CH$_2$I, and j is a number of 1 to 5 when R is —CF$_3$, or a number of 0 to 5 when R is —CF$_2$I, and $$CF_2\!\!=\!\!CFCF_2OCH_2(CF_2)_kZ \tag{IV}$$

wherein k is a number of 1 to 12, and Z is a hydrogen atom, a fluorine atom or a chlorine atom.

9. The aqueous coating composition according to claim 1, wherein the inorganic composite compound is a compound of the formula:

$$((Mg^{2+})_{1-a}(Me^{3+})_a(OH)_2)^{a+}((A^{n-})_{a/n}\cdot zH_2O)^{a-}$$

Me$^{3+}$ is a trivalent metal cation, A$^{n-}$ is a n-valent anion, z is a number of 0 to 20, and a is a positive number of up to 0.33.

* * * * *